United States Patent [19]

Donermeyer et al.

[11] Patent Number: 4,581,410

[45] Date of Patent: Apr. 8, 1986

[54] HOT MELT ADHESIVE COMPOSITIONS

[75] Inventors: Donald D. Donermeyer, Springfield; Joseph G. Martins, deceased, late of Ludlow, by Alice J. Martins, executor; Joseph C. Martins, executor, Woburn, all of Mass.

[73] Assignee: Monsanto Company, St. Louis, Mo.

[21] Appl. No.: 569,017

[22] Filed: Jan. 9, 1984

[51] Int. Cl.$^4$ ............................................. C08L 77/12
[52] U.S. Cl. ........................................ 525/92; 525/167
[58] Field of Search .................................. 525/92, 167

[56] References Cited

U.S. PATENT DOCUMENTS

| | | | |
|---|---|---|---|
| 3,435,093 | 3/1969 | Cope | 525/919 |
| 3,634,543 | 1/1972 | Sherman | 260/857 R |
| 3,639,527 | 2/1972 | Brinkmann | 525/176 |
| 3,645,932 | 2/1972 | Harrison | 260/DIG. 35 |
| 3,650,999 | 3/1972 | Martins | 260/22 |
| 3,755,221 | 8/1973 | Hitch | 264/300 |
| 4,130,603 | 12/1978 | Tanaka | 525/408 |
| 4,322,335 | 3/1982 | Nield | 525/176 |
| 4,351,757 | 9/1982 | Hoeschele | 524/169 |
| 4,363,892 | 12/1982 | Shain | 524/539 |
| 4,412,040 | 10/1983 | Albee | 525/176 |

FOREIGN PATENT DOCUMENTS

| | | |
|---|---|---|
| 8288699 | 9/1982 | Australia . |
| 0009951 | 4/1980 | European Pat. Off. . |
| 2015013 | 9/1979 | United Kingdom . |
| 2015014 | 9/1979 | United Kingdom . |

*Primary Examiner*—John C. Bleutge
*Assistant Examiner*—Patricia A. Short
*Attorney, Agent, or Firm*—R. Bruce Blance; Linda L. Lewis; William J. Farrington

[57] ABSTRACT

Crystallizable hot melt adhesive compositions comprising block copolyesteramides and alkali metal salts of carboxy polymers. The block copolyesteramides comprise hard or crystalline polyester blocks and soft or amorphous polyamide blocks in the weight ratio of 2:3 to 4:1. The alkali metal salts are salts of copolymers of $C_1$ to $C_4$ aliphatic olefins and acrylic or methacrylic acid or salts of copolymers of aromatic olefins and maleic anhydride and provide a concentration of alkali metal cation in the range of 0.1 to 15 meq per 100 parts by weight of copolyesteramide. The hot melt adhesive compositions are useful for bonding plastic parts to form plastic structures which are relatively free of bond line distortion.

11 Claims, No Drawings

HOT MELT ADHESIVE COMPOSITIONS

BACKGROUND OF THE INVENTION

This invention relates to hot melt copolyesteramide adhesive compositions. More particularly, the invention relates to crystallizable block copolyesteramides containing alkali metal salts of carboxy polymers useful as hot melt adhesives.

The utility of crystallizable block copolyesteramides as hot melt adhesives has long been recognized. Such copolyesteramides contain hard or crystallizable polyester blocks which upon crystallization enhance the tensile strength, toughness and high temperature performance of the copolymer and improve its performance as an adhesive, and amorphous polyamide blocks which contribute wettability, elasticity and rubber character to the copolymer and improve the viscosity and rheology of the molten copolymer to allow ready application to the substrate. However, such copolyesteramides tend to crystallize slowly and incompletely and form bonds in which stresses are created by crystallization of the copolymer after it has cooled below the glass transition temperature of the crystalline segments or later when the bond is subjected to annealing conditions. Such stresses can cause weakening of the bond to rigid or high modulus substrates and can cause surface distortion of flexible substrates by projection of the stresses at the interface into the substrate. In severe cases the distortion of smooth glossy substrates is manifested along the line of the bond in an excessive distortion of an image reflected in the outer surface of the substrate, a phenomenon named by the practitioners of the adhesive art "surface image distortion" or "bond-line read-out".

We have now discovered crystallizable hot melt adhesive compositions which provide strong adhesive bonds in which the bond stresses generated upon cooling of the adhesive are substantially reduced and the undesirable effects of such stresses are minimized. These adhesive compositions contain an alkali metal salt of a carboxy polymer. More particularly the compositions comprise a crystallizable copolyesteramide and from about 0.1 to about 15.0 meq of an alkali metal cation per 100 parts by weight of copolyesteramide. The alkali metal cation is present in the form of an alkali metal salt of a copolymer of a $C_1$ to $C_4$ olefin and acrylic or methacrylic acid or an alkali metal salt of a copolymer of an aromatic olefin and maleic anhydride. The block copolyesteramide comprises from 40 to 80 weight percent of crystalline polyester segments and from 20 to 60 weight percent of amorphous polyamide segments and has a crystalline melting point above about 100° C. and a number average molecular weight in the range of about 8000 to about 30000. Preferably the crystalline melting point is in the range of from 150° to 225° C. and the polyesteramide has a glass transition temperature generally less than 50° C. and preferably in the range of about −50° to 40° C.

The crystalline polyester incorporated into the block copolymer to provide the crystalline segments of melting point at least about 100° C., advantageously has a number average molecular weight in the range of about 1000 to about 24000, preferably about 1000 to about 6000, and advantageously has a crystalline melting point of at least about 150° C. Preferably the melting point of the crystalline polyester is in the range of from 180° to 270° C. The hard crystalline segments provided by the polyester contribute tensile strength, toughness and high temperature performance to the block copolymer.

The crystalline polyester is a condensate of at least one aliphatic or alicyclic diol having from 2 to 10 carbon atoms and at least one aromatic dicarboxylic acid having from 8 to 20 carbon atoms, the diol and diacids being selected to provide polyesters in the desired melting point range. Representative diols include ethylene glycol, tetramethylene glycol, 1,4-cyclohexane diol and 1,4-cyclohexane dimethanol. Representative diacids include terephthalic acid, isophthalic acid and 2,6-, 2,7-, 2,8-, 1,4- and 1,5-naphthalene dicarboxylic acids. The preferred crystalline polyesters include polybutylene terephthalate, polyethylene terephthalate and poly-(ethylene terephthalate-co-isophthalate) containing up to 10 percent of the acid units as isophthalate units.

When the hard polyester segments comprise polybutylene terephthalate, polyethylene terephthalate or poly(ethylene terephthalte-co-isophthalate) a suitable molecular weight range of the polyester prior to condensation with the polyamide segments, corresponds to an inherent viscosity range of about 0.05 to about 0.7 dl $g^{-1}$, determined at 25° C. with a solution of 0.5 g of polyester per 100 ml of a solvent pair consisting of phenol and symtetrachloroethane in the weight ratio of 60:40. Preferably the inherent viscosity is in the range of about 0.1 to about 0.3.

The soft, amorphous or low melting segments of the block copolymer contribute wettability, elasticity and rubber character to the copolymer. They comprise polyamide segments advantageously of number average molecular weight in the range of about 300 to about 16,000 and possess a glass transition temperature less than about 50° C. and more preferably in the range of about −50° to about 40° C.

The soft, amorphous or low-melting polyamide segments can be prepared by condensing an aliphatic or alicyclic diamine having from 2 to 12 carbon atoms with a mixture of an aliphatic or alicyclic dicarboxylic acid having from 4 to 54 carbon atoms, at least 40 weight percent being an aliphatic dicarboxylic acid having from 18 to 54 carbon atoms. The preferred amorphous polyamide segments are prepared by condensing a linear diprimary amine of 2 to 10 carbon atoms, with a dimer acid or a trimer acid. By dimer acid is meant the $C_{36}$ oxylic acid which is obtained by the dimerization of $C_{18}$ fatty acids. By trimer acid is meant the $C_{54}$ tricarboxylic acid which is obtained by the trimerization of $C_{18}$ fatty acids. Both unsaturated and saturated dimer and trimer acids are readily available. The commercial grades of dimer acid normally contain at least minor amounts of starting monocarboxylic acid and higher polymers, principally trimer acid. Likewise, commercial trimer acid normally contains traces of monocarboxylic acid and larger amounts of dimer acid. Obviously, mixtures of dimer and trimer acids can be used. Preferred dimer acids contain from 75 to 98 weight percent of dimer and more preferably from 90 to 98 weight percent of dimer. It should be noted that other unsaturated monocarboxylic acids can also be dimerized or trimerized to form polycarboxylic acids of at least 18 carbon atoms which are useful in the present invention.

The block copolymers are prepared by a one step or two step method. In the one step method the components which form the hard or soft segments are polymerized in the presence of a prepolymer of the soft or hard segments respectively. In the two step method the hard segments and soft segments are prepared separately as prepolymers and then condensed together.

The melting point and glass transition temperatures of copolyesteramides and the component polyesters and polyamides are conveniently determined with a Perkin Elmer DSC-2 differential scanning calorimeter equipped with a thermal analysis data station, by heating a 5 to 25 mg sample of copolymer at a rate of 20° C. per minute, in a nitrogen atmosphere. The melt viscosity of the copolymer determined at a temperature of about 10° C. above the melting point of the copolymer and at a shear rate of 4 sec$^{-1}$ is advantageously in the range of about 50 to about 300 Pa.sec. and is preferably in the range of about 100 to about 200 Pa.sec.

The most preferred group of block copolymers are block copoly(esteramides) of the type described in U.S. Pat. No. 3,650,999 especially block copolyesteramides of polyethylene terephthalate or polybutylene terephthalate and a polyamide of an aliphatic primary diamine and dimer acid containing 75 to 98 weight percent dimer and more preferably 90 to 98 weight percent dimer.

To obtain the compositions of the present invention, alkali metal salts of copolymers of $C_1$ to $C_4$ olefins and acrylic or methacrylic acid or alkali metal salts of aromatic olefins and maleic anhydride such as styrene maleic anhydride copolymers are added to the block copolyesteramides to provide a concentration in the range of from about 0.1 to about 15 meq of alkali metal cation per 100 parts by weight of copolyesteramide. Although any alkali metal can be used to form the salt the preferred salts are sodium and potassium salts with sodium being especially preferred. The salts may function as nucleating agents altering the rate and degree of crystallinity of the copolyesteramide. The preferred salts are the sodium and potassium salts of ethylene-methacrylic acid copolymers (including both wholly and partially neutralized salts e.g. at least about 30% neutralized). In the copolymers set forth above, the olefin or aromatic olefin moiety ordinarily comprises 50–98 percent by weight of the copolymer and preferably 80–98 percent. The molecular weight of the copolymer is not critical. It may advantageously be selected to provide a melt index in the range of about 0.3 to about 12, determined by ASTM test D1238-52T at 303 kPa and 190° C.

The preferred salts are those salts which have melting points less than about 250° C. and can be readily incorporated in the hot melt copolyesteramide by melt blending.

The upper limit of the alkali metal copolymer salt is not critical. However when the copolyesteramides are used as hot melt adhesives, the open time for the adhesive may be undesirably shortened or the temperature of application may have to be increased to maintain the composition in a molten state when higher amounts of salt are used. In general the amount of salt added will be less than about 15 meq of alkali metal cation per 100 parts by weight of copolyesteramide while the lower limit will be greater than about 0.1 meq per 100 parts by weight of copolyesteramide. Preferably the amount of alkali metal cation will be in the range of about 0.5 to about 9 meq per 100 parts by weight of copolyesteramide.

Plastic structures made from thin, lightweight sheets of plastics such as rigid urethane, polycarbonate, polyethylene terephthalate, polybutylene terephthalate, nylons such as nylon 6,6 and sheet molding compound are gaining increased acceptance in appliance and automobile body manufacture, especially in hoods, trunk lids, doors, tailgates and roofs. When such structures are bonded, distortion of the surface may occur by projection of adhesive stresses into the reinforced plastic and is manifested by distortion of the image reflected in the outer surface (surface image distortion or SID). The stresses appear to be related to the physical changes in hot melt adhesives or the chemical and physical changes in thermoset adhesives which occur in the adhesive when it sets. A qualitative scale for surface image distortion ranges from 0 when distortion is gross to 5 when there is no apparent distortion The intermediate ratings are 1 for distortion obvious from any angle, 2 for distortion easily detectable from certain angles, 3 for distortion which is detectable and 4 for distortion which is barely detectable. The distortion can be increased by further changes in the adhesive when the plastic structure is painted and passed through a paint oven to cure the paint. Moreover the glossy surface provided by the paint tends to reveal the surface distortion more than an unpainted surface because of its greater reflectivity. The hot melt adhesive compositions of the present invention impart significantly less distortion of such bonded plastic parts with the result that thinner sheets or sheets of lower modulus may be used in the manufacture of the plastic structures.

A quantitative evaluation of surface distortion can be made by means of a surface profilometer such as the Bendix Model S-2 and correlated with the qualitative scale.

TABLE I

| SID Rating | Visual Appearance of Distortion | Distortion, mm × $10^6$ |
|---|---|---|
| 0 | Gross Distortion | >3000 |
| 1 | Obvious from any angle | 2100–3000 |
| 2 | Easily Detectable | 1550–2100 |
| 3 | Detectable | 951–1550 |
| 4 | Barely Detectable | 101–950 |
| 5 | No Apparent Distortion | 0–100 |

When the copolyesteramide composition of the present invention is used to bond sheets of plastic it is advantageous to prime the areas which are to be bonded with a suitable primer coat such as a moisture-curable polyisocyanate. Moisture-curable polyisocyanates are particularly useful as primers of sheet molding compound, reaction injection molded polyurethane and reaction injection molded nylon compositions. Primer compositions comprising an epoxidized novolac resin and a resinous amidopolyamine may also be used with sheet molding compound.

The conditions for bonding may affect the degree of surface deformation of the bonded structure. In particular, the open time or time between application of the adhesive and closing the parts to form the bond, the temperature of the substrate and the pressure and the time of clamping of the parts being bonded may influence the degree of surface distortion. While the optimum conditions for a particular substrate and adhesive will require some routine experimentation, in general the copolyesteramide adhesive is advantageously applied to provide a line of molten copolyesteramide of suitable configuration at a temperature at least about 5° C. above its melting point to the first of two parts of plastic to be bonded together. Advantageously the parts are preheated prior to application of the adhesive to prolong the open time or time between application of the adhesive and closing of the bond. The temperature of the preheated parts is advantageously chosen to give sufficient open time to insure wettability of the parts by the adhesive and the desired thickness of the bond. Generally the temperature is in the range of about 70° to 120° C. The second part of plastic is mated to the first part while the adhesive is still molten, generally within about one minute of laying down the line of molten adhesive, and the parts are held together by means of a clamp which exerts a substantially uniform pressure along the bond line. Advantageously the clamp pressure is applied in the range of about 1 to about 6 psi (6.89 to about 41.3 kPa) for a time in the range of about 15 secs to about 120 secs. until the adhesive has cooled sufficiently to allow it to crystallize and set the bond.

The addition of the alkali metal salts of the carboxy copolymers to the copolyesteramides to provide the compositions of the present invention also enhances the mechanical properties of the copolyesteramides such as the tensile strength, tensile elongation and toughness and can enhance the peel strength of bonds prepared from the compositions.

The hot melt adhesives used in the present invention may also contain UV-, thermo- and hydrolytic stabilizers, wetting agents, flow control agents, pigments and other additives.

The following examples are set forth to illustrate the invention and should not be construed as limiting the scope thereof. Unless otherwise indicated, all parts and percentages are by weight.

EXAMPLE 1

A block copolymer which is approximately 70 percent by weight crystaline polyethylene terephthalate segments and 30 percent by weight amorphous polyamide segments made from dimer acid and hexamethylene diamine, is prepared in two steps. In the first step 157.5 parts (0.272 mol) of a $C_{36}$ dimer acid and 30.8 parts of an 82% aqueous solution (0.217 mol) of hexamethylenediamine are charged to a reaction vessel and heated with agitation at about 215° C. for one hour to form a polyamide resin. During the first 30 minutes the pressure rises to 1000 kPa after which time the reaction vessel is vented to reduce the pressure to 600 kPa. At the end of one hour the pressure is released and 417 parts of a crystalline polyethylene terephthalate (M.P.=260° C./inherent viscosity 0.147) and 7.5 parts (0.095 mol) of ethylene glycol are charged to the vessel along with a minor amount of an antioxidant. The vessel is flushed with nitrogen and the mixture is heated to about 280° C. while maintaining a nitrogen pressure of 240 kPa. After 0.5 hour the vessel is vented and vacuum applied and the reaction is continued under full vacuum (0.1 to 5 mm. of mercury) for two hours. At the end of this time the resulting molten copolyesteramide is discharged under pressure into a water bath to quench the material. The polymer obtained melts at 205° C. and the inherent viscosity is 0.56. The melt viscosity determined at 216° C. and a shear rate of 4 sec.$^{-1}$ is 118 Pa.s.

100 parts by weight of the block copolyesteramide is melted and held at a temperature of 210° C. 1.00 parts by weight of a sodium salt of a copolymer of ethylene and methacrylic acid sold by E.I. duPont de Nemours and Co. under the trademark Surlyn 8660 is sprinkled into the melt and the melt is stirred to dissolve the copolymer salt and disperse it uniformly in the melt. The melt is then quench cooled to room temperature and stored in a sealed container to exclude moisture.

Test panels of reinforced plastic prepared from a polyester sheet molding compound containing 33 weight percent glass fiber and 33 weight percent clay, are wiped with toluene to remove surface contaminants. The panels are used in pairs consisting of a flat panel (305×305×2.03 mm) and a panel (229×102×2.54 mm) with a channel running longitudinally which is 50.8 mm wide and 25.4 deep and has flanges of 25.4 mm on each side of the channel to provide the bonding surfaces for attachment to the flat panel. A 6 weight percent methylene chloride solution of a primer composition comprising 60 parts by weight of an epoxidized novolac resin of epoxy equivalent weight 175, sold by Dow Chemical Co. under the tradename DEN 431, 30 parts by weight of a resinous amidopolyamine sold by General Mills Inc. under the tradename Versamid 125 and 10 parts by weight of 4,4'-methylene dianiline is applied to the bonding surfaces of the panels to provide a thin continuous film of dry primer composition. The panels are heated to 100° C. The block copolyesteramide containing the copolymer salt is melted in a hot melt applicator and the molten adhesive is extruded as molten strand of about 0.6 mm diameter in single lines running down the center of the two flanges of the channeled panel and the panel is closed against its flat mate. The panels are clamped together to provide a uniform pressure of about 20 kPa along the bond lines for 2 minutes. The panels are allowed to cool.

The bonded assemblies are top coated with a high gloss black enamel which is forced dried at 162° C. for thirty minutes. The surface image distortion rating (SID rating), on a scale of 0 to 5, is 2.5.

EXAMPLES 2 AND 3

The copolyesteramide of Example 1 is melt blended with the copolymer salt to provide concentrations of 2.0 and 4.0 weight percent of salt in Examples 2 and 3 respectively. Bonding tests are carried out as in Example 1. The surface image distortion ratings are respectively 2.8 and 2.1.

COMPARATIVE EXAMPLE 1

The copolyesteramide of Example 1 without salt is subjected to the bonding test of Example 1. The surface image distortion rating is 1.5. The data for Examples 1-3 and comparative Example 1 are presented in Table II. The mechanical properties of bonded samples of Examples 1-3 and comparative Example 1 are presented in Table II. Tensile strength and elongation are determined by ASTM Test Method D882-81; Lap bond tensile strength is measured by ASTM Test Method D-1002-72; peel adhesion is measured by ASTM Test Method D-1876-72.

TABLE II
SURFACE DISTORTION RATINGS OF BONDED STRUCTURES

| Example | Sodium Salt | Concentration wt. % | $\Delta H_M$ cal/g | $\Delta H_H$ cal/g | SID Image Rating |
|---|---|---|---|---|---|
| 1 | EMA copolymer | 1.0 | 5.4 | 0.0 | 2.5 |
| 2 | EMA copolymer | 2.0 | 5.2 | 0.0 | 2.8 |
| 3 | EMA copolymer | 4.0 | 4.9 | 0.0 | 2.1 |
| Comparative 1 | — | — | 6.6 | 2.92 | 1.5 |

TABLE III

| | ADHESIVE PROPERTIES | | | | |
|---|---|---|---|---|---|
| Example | Viscosity @ 215° C., cps. | Tensile MPa | Elong. % | Lap shear MPa | T-peel kN/m |
| 1 | 99,400 | 27.4 | 400 | 16.7 | 1.6 |
| 2 | 123,400 | 28.4 | 440 | 19.4 | 1.6 |
| 3 | 240,000 | 27.8 | 500 | 17.2 | 0.7 |
| Comparative 1 | 82,000 | 25.8 | 490 | 18.5 | 0.52 |

EXAMPLES 4, 5, 6 AND COMPARATIVE EXAMPLE 2

A copolyesteramide comprising 50 parts by weight of poly(ethyleneterephthalate) segments and 50 parts by weight of amide segments condensed from hexamethylene diamine and dimer acid is prepared as in Example 1. The copolyesteramide melts at 168° C., has an inherent viscosity of 0.6 and a melt viscosity of 116 Pa.s determined at 216° C. and at a shear rate of 4 sec$^{-1}$.

The copolyesteramide is melt blended with 0.25, 0.5 and 1 percent Surlyn 8660 to provide adhesive compositions for Examples 4, 5 and 6. Bonding tests are carried out as set forth in Example 1. The SID ratings are respectively 4.8, 4.7 and 4.5. In Comparative Example 2, the copolyesteramide is the same as that used in Example 4, 5 and 6, without the addition of a sodium carboxylate. The SID rating is 4.3. The data are presented in Table IV. Mechanical properties are set forth in Table V.

TABLE IV

| | SURFACE DISTORTION RATINGS OF BONDED STRUCTURES | | | | |
|---|---|---|---|---|---|
| Example | Sodium Salt | Concentration | $\Delta H_M$ cal/g | $\Delta H_H$ cal/g | SID Rating |
| 4 | EMA copolymer | 0.25 | 1.8 | 1.13 | 4.8 |
| 5 | EMA copolymer | 0.5 | 1.4 | 1.17 | 4.7 |
| 6 | EMA copolymer | 1.0 | 1.4 | 1.08 | 4.5 |
| Comparative 2 | — | — | 1.6 | 1.22 | 4.3 |

TABLE V

| | ADHESIVE PROPERTIES | | | | |
|---|---|---|---|---|---|
| Example | Viscosity @ 215° C., cps. | Tensile MPa | Elong. % | Lap Shear MPa | T.Peel kN/m |
| 4 | 89,600 | 15.0 | 720 | 12.2 | 3.3 |
| 5 | 117,600 | 15.5 | 700 | 13.7 | 4.4 |
| 6 | 131,600 | 16.3 | 750 | 12.9 | 4.6 |
| Comparative 2 | 106,200 | 13.1 | 560 | 11.3 | 6.5 |

We claim:

1. A composition of matter comprising a crystallizable copolyesteramide and from about 0.1 to about 15.0 meq of an alkali metal cation per 100 parts by weight of copolyesteramide wherein the block copolyesteramide comprises from 40 to 80 weight percent of crystalline polyester segments wherein the crystalline polyester segment is the condensation product of at least one aliphatic or alicyclic diol having from 2 to 10 carbon atoms with at least one aromatic dicarboxylic acid having from 8 to 20 carbon atoms and from 20 to 60 weight percent of amorphous polyamide segments wherein the amorphous polyamide segment is the condensation product of an aliphatic diamine having 2 to 12 carbon atoms with an aliphatic or alicyclic dicarboxylic acid having from 4 to 54 carbon atoms with at least 40 weight percent being an aliphatic dicarboxylic acid having 18 to 54 carbon atoms wherein the block copolyesteramide has a crystalline melting point above about 100° C. and a number average molecular weight in the range of about 8,000 to about 30,000 and wherein the alkali metal cation is provided by an alkali metal salt of a copolymer of a $C_1$ to $C_4$ olefin and acrylic acid or methacrylic acid or a copolymer of an aromatic olefin and maleic anhydride.

2. The composition of claim 1 wherein the crystalline melting point is above about 150° C.

3. The composition of claim 1 wherein the copolymer is a copolymer of ethylene and acrylic acid or methacrylic acid containing from 50 to 98 weight percent ethylene.

4. The composition of claim 1 wherein the crystalline segments of the block copolymer comprise polyethylene terephthalate or polybutylene terephthalate and the amorphous segments comprise a polyamide condensation product of a dimer acid containing 75 to 98 weight percent dimer and an aliphatic primary diamine of 2 to 10 carbon atoms.

5. The composition of claim 4 wherein the alkali metal salt is a copolymer of ethylene and acrylic or methacrylic acid containing from 50 to 98 weight percent ethylene, at least 30 percent neutralized with sodium or potassium.

6. The composition of claim 1 wherein the alkali metal salt is incorporated into the copolyesteramide by melt blending.

7. The composition of claim 5 wherein the copolymer contains from 80 to 98 weight percent ethylene.

8. The composition of claim 4 wherein the concentration of alkali metal cation is in the range of about 0.5 to about 9 meq per 100 parts by weight of copolyesteramide.

9. A composition of matter comprising a crystallizable block copolyester amide and from about 0.1 to about 15 meq of an alkali metal cation per 100 parts weight of block copolyesteramide wherein the block copolyesteramide comprises from 40 to 80 weight percent of crystalline segments of poly(ethylene terephthalate-co-isophthalate) and 20 to 60 weight percent of amorphous segments of the polyamide condensate of a dimer acid of a $C_{18}$ fatty acid containing from 75 to 98 weight percent of dimer and an aliphatic primary diamine of 2 to 10 carbon atoms, wherein the number average molecular weight of the copolyesteramide is in the range of about 8,000 to about 30,0000, wherein the ratio of terephthalic moieties to isophthalic moieties of the poly(ethylene terephthalate-co-isophthalate) is the range of 90:10 to 100:0 and wherein the alkali metal cation is provided by an alkali metal salt of a copolymer of a $C_1$ to $C_4$ olefin and acrylic or methacrylic acid or a copolymer of an aromatic olefin and maleic anhydride containing from 50 to 98 weight percent of olefin or aromatic olefin.

10. The composition of claim 9 wherein the alkali metal salt is a copolymer of ethylene and acrylic or methacrylic acid containing from 50 to 98 weight percent ethylene, at least 30 percent neutralized with sodium or potassium and the concentration of sodium or potassium salt is in the range of about 0.5 to about 9 meq per 100 parts by weight of copolyesteramide.

11. The composition of claim 10 wherein the alkali metal salt is incorporated into the copolyesteramide by melt blending.

* * * * *